(12) United States Patent
Tenny et al.

(10) Patent No.: US 9,578,619 B2
(45) Date of Patent: Feb. 21, 2017

(54) MOBILE STATION POSITIONING ASSISTANCE WITH LOCAL MAPPING DATA

(71) Applicant: QUALCOMM Incorporated, San Diego, CA (US)

(72) Inventors: Nathan Tenny, Poway, CA (US); Rajarshi Gupta, Sunnyvale, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/812,440

(22) Filed: Jul. 29, 2015

(65) Prior Publication Data

US 2015/0334525 A1    Nov. 19, 2015

Related U.S. Application Data

(63) Continuation of application No. 13/015,531, filed on Jan. 27, 2011, now Pat. No. 9,131,459.

(Continued)

(51) Int. Cl.
*H04W 24/00* (2009.01)
*H04W 64/00* (2009.01)
(Continued)

(52) U.S. Cl.
CPC ............ *H04W 64/00* (2013.01); *H04W 4/02* (2013.01); *H04W 4/20* (2013.01); *H04W 84/042* (2013.01)

(58) Field of Classification Search
CPC ................................ H04W 64/00; H04W 4/02
(Continued)

(56) References Cited

U.S. PATENT DOCUMENTS

| 7,085,577 | B1 * | 8/2006 | Katsuno | H04W 4/02 |
| | | | | 455/41.1 |
| 8,078,189 | B2 * | 12/2011 | Chang | G01S 19/05 |
| | | | | 342/357.2 |

(Continued)

FOREIGN PATENT DOCUMENTS

| CN | 1518391 A | 8/2004 |
| CN | 1616986 | 5/2005 |

(Continued)

OTHER PUBLICATIONS

International Preliminary Report on Patentability—PCT/US2011/023217, The International Bureau of WIPO—Geneva, Switzerland, Apr. 19, 2012.

(Continued)

*Primary Examiner* — Chuck Huynh
(74) *Attorney, Agent, or Firm* — Mahmoud Munes Tomeh

(57) ABSTRACT

Techniques are provided which may be implemented using various methods and/or apparatuses for use in providing positioning assistance data to mobile stations. For example, a method in a first server in a cellular network may comprise sending a request for location information to a mobile station. A request for assistance data indicating an address of a second server may be received from the mobile station. Based on this address, a request for local mapping data may be sent to the second server. The local mapping data may be received from the second server. The assistance data based on the local mapping data and identifying a wireless signal transmitter may be sent to the mobile station. The location information, based on the assistance data and on a positioning operation based on a wireless signal transmitted by the identified wireless signal transmitter may be received from the mobile station.

21 Claims, 7 Drawing Sheets

Related U.S. Application Data

(60) Provisional application No. 61/300,347, filed on Feb. 1, 2010.

(51) Int. Cl.
  *H04W 4/02* (2009.01)
  *H04W 4/20* (2009.01)
  *H04W 84/04* (2009.01)

(58) Field of Classification Search
  USPC .................. 455/456.2, 456.1, 457, 456.5
  See application file for complete search history.

(56) References Cited

U.S. PATENT DOCUMENTS

| | | |
|---|---|---|
| 2003/0229441 A1 | 12/2003 | Pechatnikov et al. |
| 2005/0020309 A1 | 1/2005 | Moeglein et al. |
| 2005/0116858 A1* | 6/2005 | Odamura ............... G01S 19/50 342/357.62 |
| 2006/0194591 A1 | 8/2006 | Xiong et al. |
| 2006/0240841 A1 | 10/2006 | Bhattacharya |
| 2007/0049295 A1 | 3/2007 | Soliman et al. |
| 2007/0258421 A1 | 11/2007 | Alizadeh-Shabdiz et al. |
| 2009/0085806 A1 | 4/2009 | Piersol et al. |
| 2009/0274099 A1 | 11/2009 | Gao et al. |
| 2010/0093326 A1 | 4/2010 | Shim |
| 2011/0190004 A1 | 8/2011 | Tenny et al. |

FOREIGN PATENT DOCUMENTS

| | | |
|---|---|---|
| CN | 1849525 A | 10/2006 |
| CN | 1980417 A | 6/2007 |
| CN | 101043747 A | 9/2007 |
| CN | 101292563 A | 10/2008 |
| EP | 1443791 A1 | 8/2004 |
| JP | 2004235762 A | 8/2004 |
| JP | 2005341369 A | 12/2005 |
| JP | 2008109294 A | 5/2008 |
| JP | 2009171365 A | 7/2009 |
| JP | 2010062770 A | 3/2010 |
| WO | 0217567 A2 | 2/2002 |
| WO | 2005050245 A2 | 6/2005 |
| WO | 2007025151 | 3/2007 |
| WO | 2009086278 A1 | 7/2009 |
| WO | 2009135186 | 11/2009 |

OTHER PUBLICATIONS

International Search Report and Written Opinion—PCT/US2011/023217—ISA/EPO—Apr. 18, 2011.

Taiwan Search Report—TW100103696—TIPO—Oct. 1, 2013.

Taiwan Search Report—TW103101833—TIPO—Dec. 23, 2014.

* cited by examiner

500

Transmit A Request For Assistance Data To A First Server, The Assistance Data Being Based, At Least In Part, On Local Mapping Data Obtained By The First Server From A Second Server > The Request For Assistance Data Being Indicative Of At Least One Of: The Second Server, The Third Server, Or A Coarse Position Of The Mobile Station
> — 504

> Transmit A Request For Second Server Information To A Third Server And Obtain The Second Server Information From The Third Server, And Wherein The Second Server Information Is Indicative Of The Second Server, And The Request For Assistance Data Is Based, At Least In Part, On The Second Server Information
> — 506

— 502

Obtain The Assistance Data From The First Server

— 508

Determine Location Information Associated With The Mobile Station Based, At Least In Part, On The Assistance Data

— 510

Transmit The Location Information To The First Server

MOBILE STATION POSITIONING ASSISTANCE WITH LOCAL MAPPING DATA

CROSS-REFERENCE TO RELATED APPLICATIONS

This application is a continuation of prior application Ser. No. 13/015,531, entitled "Mobile Station Positioning Assistance With Local Mapping Data," filed Jan. 27, 2011, which claims the benefit of U.S. Provisional Application No. 61/300,347, filed Feb. 1, 2010 entitled "Positioning with Involvement of Network Positioning Server", filed Feb. 1, 2010. All of the applications listed above are assigned to the assignee hereof and expressly incorporated herein by reference.

BACKGROUND

1. Field

The subject matter disclosed herein relates to electronic devices, and more particularly to methods and apparatuses for use in providing positioning assistance data with local mapping data to mobile stations.

2. Information

The Global Positioning System (GPS) and other like satellite positioning systems have enabled navigation services for mobile handsets in outdoor environments. Since satellite signals may not be always be reliably received and/or acquired in an indoor environment, different techniques may be employed to enable position estimation and related navigation services. For example, mobile stations can typically obtain a position fix by measuring ranges to three or more terrestrial radio transmitters which are positioned at known locations. Such ranges may be measured, for example, by obtaining a MAC ID address from signals received from such access points and measuring one or more characteristics of signals received from such access points such as, for example, signal strength, round trip delay, just to name a few examples.

By way of additional example, a mobile station, such as, a mobile phone, smart phone, etc., may perform signal-based position estimation to identify its location within a structure by taking measurements, for example of a signal strength (e.g., an RSSI) and/or propagation time (e.g., a round-trip time (RTT)) for signals exchanged with various radio transmitters (e.g., access points, beacons, etc.). A mobile station may use these or other like measurements to obtain a probability distribution over a region of space (e.g., defined using two or coordinates (x, y), etc.). Such a probability distribution or other like information may, for example, be used in a particle filter, Kalman filter, and/or other positioning mechanism using known techniques.

In some implementations, an indoor navigation system may provide a digital electronic map to mobile stations, e.g., as a user enters a particular indoor area. Such a map may show indoor features such as doors, hallways, entry ways, walls, etc., points of interest such as bathrooms, pay phones, room names, stores, etc. Such a digital electronic map may be stored at a server to be accessible by a mobile station through selection of an Internet based URL, for example. Thus, to obtain such a map, a mobile station may need to leave a serving network or other cellular network and/or otherwise access a local area network and/or the Internet. By obtaining and displaying such a map, a mobile station may overlay a current location of the mobile station (and user) over the displayed map to provide the user with additional context. Using map information indicating routing constraints, a mobile station may also apply location estimates to estimating a trajectory of the mobile station in an indoor area subject to the routing constraints.

SUMMARY

In an example implementation, a method is provided which may be implemented with a first server in a cellular network. Such an example method may comprise: initiating transmission of a request (e.g., one or more electrical signals or other like signals representing a request) for location information to a mobile station; in response to obtaining a request for assistance data from the mobile station, initiating transmission of a request for local mapping data to a second server; in response to obtaining the local mapping data from the second server, initiating transmission of the assistance data (e.g., one or more electrical signals or other like signals representing the assistance data) to the mobile station, the assistance data being based, at least in part, on the local mapping data; and obtaining the location information from the mobile station, the location information being based, at least in part, on the assistance data.

In another example implementation, an apparatus is provided for use in a first server in a cellular network. Such an example apparatus may comprise: means for providing a request for location information to a mobile station; means for providing a request for local mapping data to a second server, in response to obtaining a request for assistance data from the mobile station; means for obtaining the local mapping data from the second server; means for providing assistance data to the mobile station, the assistance data being based, at least in part, on the local mapping data; and means for obtaining the location information from the mobile station, the location information being based, at least in part, on the assistance data.

In yet another example implementation, an apparatus is provided for use in a first server in a cellular network. Such an example apparatus may comprise: at least one network interface; and at least one processing unit to, via the at least one network interface: initiate transmission of a request for location information to a mobile station; initiate transmission of a request for local mapping data to a second server, in response to obtaining a request for assistance data from the mobile station; initiate transmission of assistance data to the mobile station, the assistance data being based, at least in part, on the local mapping data obtained from the second server; and obtain the location information from the mobile station, the location information being based, at least in part, on the assistance data.

In still another example implementation, an article of manufacture is provided. Such an example article may comprise: a non-transitory computer readable medium having stored therein computer-implementable instructions executable by one or more processing units of a first server in a cellular network to: initiate transmission of a request for location information to a mobile station; in response to obtaining a request for assistance data from the mobile station, initiate transmission of a request for local mapping data to a second server; in response to obtaining the local mapping data from the second server, initiate transmission of the assistance data to the mobile station, the assistance data being based, at least in part, on the local mapping data; and obtain the location information from the mobile station, the location information being based, at least in part, on the assistance data.

In an example implementation, a method is provided which may be implemented with a mobile station. Such an example method may comprise: transmitting a request for assistance data to a first server in cellular network, the assistance data being based, at least in part, on local mapping data obtained by the first server from a second server; obtaining the assistance data from the first server; determining location information associated with the mobile station based, at least in part, on the assistance data; and transmitting the location information to the first server.

In another example implementation, an apparatus is provided for use in a mobile station. Such an example apparatus may comprise: means for providing a request for assistance data to a first server in a cellular network, the assistance data being based, at least in part, on local mapping data obtained by the first server from a second server; means for obtaining the assistance data from the first server; means for determining location information associated with the mobile station based, at least in part, on the assistance data; and means for providing the location information to the first server.

In yet another example implementation, a mobile station may comprise: at least one network interface; and at least one processing unit to: initiate transmission of a request for assistance data to a first server in a cellular network via the at least one network interface, the assistance data being based, at least in part, on local mapping data obtained by the first server from a second server; obtain the assistance data from the first server via the at least one network interface; determine location information associated with the mobile station based, at least in part, on the assistance data; and initiate transmission of the location information to the first server via the at least one network interface.

In still another example implementation, an article of manufacture is provided. Such an example article may comprise: a non-transitory computer readable medium having stored therein computer-implementable instructions executable by one or more processing units of a mobile station to: initiate transmission of a request for assistance data to a first server in a cellular network, the assistance data being based, at least in part, on local mapping data obtained by the first server from a second server; obtain the assistance data from the first server; determine location information associated with the mobile station based, at least in part, on the assistance data; and initiate transmission of the location information to the first server.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 5 is a flow diagram illustrating certain features of an example process for use in a mobile station capable of obtaining and using positioning assistance data with local mapping data, in accordance with an implementation.

DETAILED DESCRIPTION

Figure 1:
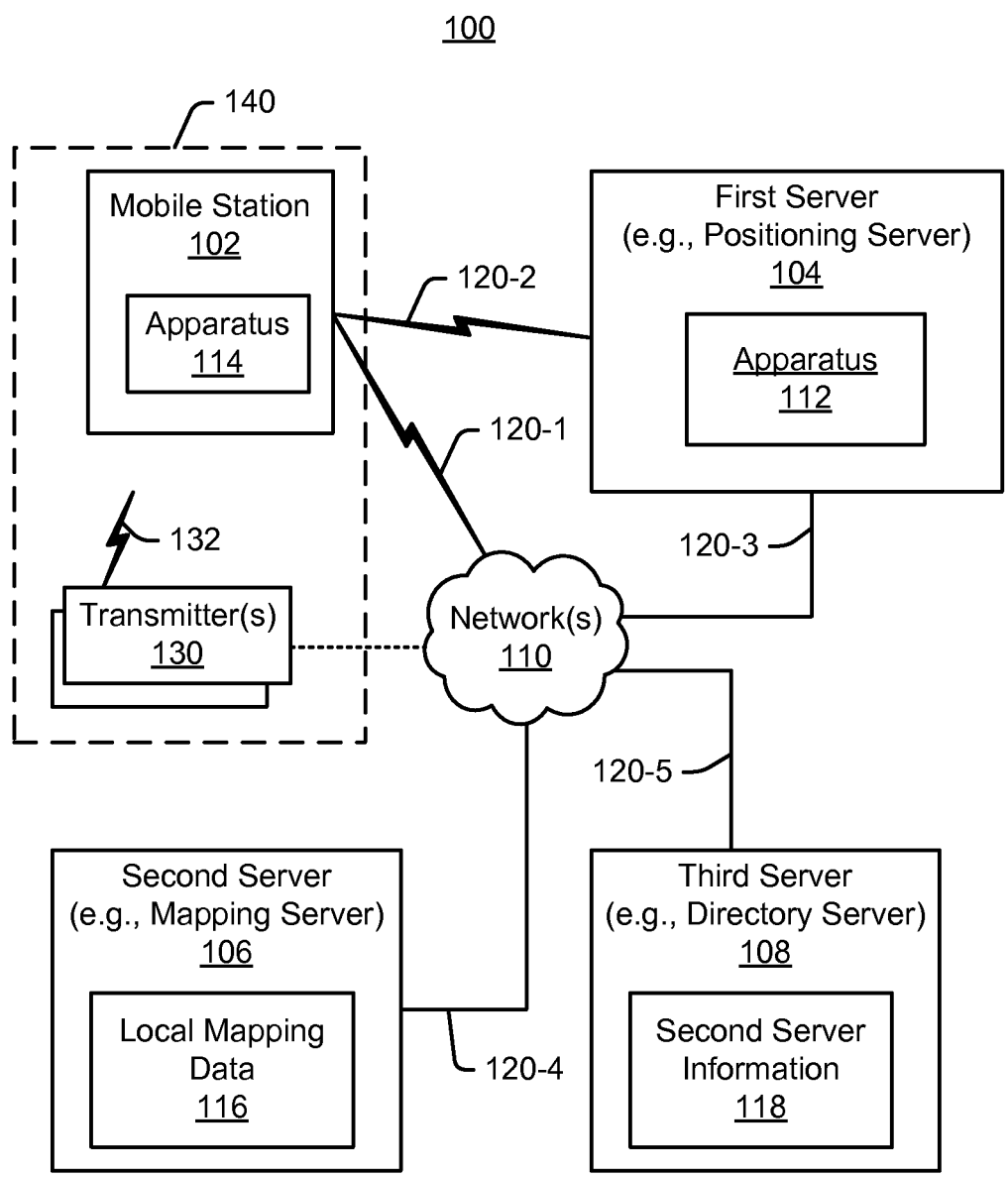
FIG. 1 is a schematic block diagram illustrating an example environment that includes one or more computing devices and a mobile station for use in providing positioning assistance data with local mapping data to the mobile station, in accordance with an implementation.

Some example techniques are provided herein which may be implemented using various methods and/or apparatuses to provide positioning assistance data with local mapping data to a mobile station. Here, for example, positioning assistance data may comprise and/or otherwise be based, at least in part, on local mapping data which may relate to a current location of the mobile station. Such positioning assistance data may, for example, be provided to a mobile station by a first server (e.g., a positioning server, and/or the like) that is within a cellular network (e.g., a serving cellular communication network, an affiliated cellular communication network, other cellular communication network that may be in communication with a serving cellular communication network, and/or the like).

As used herein, a "serving cellular communication network" comprises a home or other like cellular network operated by a service provider under an agreement with a person or entity associated with a mobile station. While various cellular networks may be affiliated or otherwise operate together to provide network services (e.g., to allow roaming, other services, etc.), there is typically a serving cellular communication network associated with a mobile station.

In certain example implementations, the first server may obtain at least a portion of the local mapping data from one or more second servers (e.g., a mapping server, and/or the like) which may or may not be in the cellular network. A second server may, for example, be identified in some manner by the mobile station and/or the first server. For example, a mobile station and/or a first server may identify an applicable second server using a third server (e.g., a directory server, and/or the like). For example, in certain implementations, a third sever may determine second server information, such as, for example, a network address, based, at least in part, on a coarse position (e.g., an estimated location, a estimated relative position, a cell identifier, explicit user input, etc.) of a mobile station. Thus, for example, should a coarse position of a mobile station indicate that the mobile station may be located within or nearby an airport or shopping mall, a second server may be identified which may provide local mapping data which may be of use in determining a location of the mobile station within such an "indoor" environment, and/or otherwise provide additional local context information, navigation information, etc., related thereto.

In certain implementations, for example, a portion of the positioning assistance data with local mapping data may identify one or more wireless signal transmitters that may transmit one or more signals which a mobile station may receive and process in some manner to determine location information (e.g., an estimated location and/or relative position) which may be provided to one or more other devices (e.g., a first server, etc.) and/or which may be of use in providing location based services, navigation services, and/or the like, via the mobile station. Various techniques are known which make use of such wireless signal transmissions to estimate a receiver's location and/or position.

In certain example implementations, techniques are provided which may be implemented using various communication protocols which allow a mobile station to communicate with various network devices over wireless and/or wired communication links within one or more networks. Thus, for example, in certain instances a mobile station may send/receive certain requests and/or responses or other like data via one or more messages supported by one or more applicable protocols. Similarly, for example, in certain instances a server (e.g., hosted or otherwise supported by one or more computing devices) may send/receive certain requests and/or responses or other like data via one or more messages supported by one or more applicable protocols. While certain example protocols are mentioned herein, it should be understood that claimed subject matter is not intended to be limited to such examples.

With this in mind, and by way of non-limiting example, a method may be implemented in a first server within at least one cellular network in which a request for location information may be transmitted (e.g., over a wireless communication link) to a mobile station. Here, for example, a first server may act a positioning server within a cellular network and selectively request such location information. A mobile station may respond to a request for location information by transmitting a request for assistance data to the first server. As described in greater detail below, in response to obtaining the request for assistance data, the first server may transmit a request for local mapping data to a second server. In response to obtaining the local mapping data from the second server, the first server may transmit positioning assistance data to the mobile station. Here, for example, such positioning assistance data may comprise or be based, at least in part, on the local mapping data. The first server may, for example, subsequently obtain location information from the mobile station which may be based, at least in part, on the previously provided assistance data.

In certain example implementations, a request for assistance data may already be indicative of one or more particular second servers. For example, in certain instances, a mobile station may identify a second server (e.g., a mapping server) based on stored information, derived information, and/or information received from one or more other devices (e.g., computing devices, mobile stations, wireless networks, etc.). In certain example implementations, a mobile station may communicate with a third server (e.g., a directory server in the same or other like cellular network) to identify a second server. Here, for example, a mobile station may provide its coarse position or other like information to a third server which may then associate such information with one or more applicable second servers which may or may not be in the cellular network.

In other example implementations as described herein, a first server (e.g., a positioning server) may identify a second server (e.g., a mapping server) based on stored information, derived information, and/or information received from one or more other devices (e.g., computing devices, mobile stations, wireless networks, etc.). In certain example implementations, a first server may provide a third server (e.g., a directory server) with a coarse position or other like information associated with a mobile station. Thus, in certain example implementations a request for assistance data may be indicative of a coarse position of the mobile station.

While a coarse position of the mobile station may be based, at least in part, on a first positioning operation, in certain example implementations location information that is subsequently obtained from the mobile station may be based, at least in part, on a second positioning operation which may be different and which makes use of received positioning assistance data with local mapping data. Thus, by way of a non-limiting example, a first positioning operation may involve a GNSS and/or other terrestrial positioning techniques that may be independent or otherwise provided, supported or augmented by a cellular network, and a second positioning operation may involve a location based service (LBS) and/or the like provided by or otherwise supported by transmitting devices (e.g., beacons, access points, etc.) of one or more WLANs or the like. Hence, in certain instances a second positioning operation may comprise an "indoor" positioning operation (e.g., associated with one or more structures, services, businesses, events, etc.) based, at least in part, on one or more wireless signal transmitters identified in the received positioning assistance data with local mapping data. For example, such positioning assistance data may identify a location of a transmitter, and/or other useful information that may be available in the local mapping data.

In certain example implementations, a method may be provided for use in a mobile station. Here, for example, a method may comprise transmitting a request for assistance data to a first server in a cellular network. The requested assistance data may, for example, be based, at least in part, on local mapping data that may be obtained by the first server from a second server. The mobile station may obtain such positioning assistance data from the first server, and may determine location information associated with the mobile station based, at least in part, on the positioning assistance data. The mobile station may, for example, transmit the location information to the first server and/or other devices.

Attention is drawn now to FIG. 1 which is a schematic block diagram illustrating an example environment 100 that includes a first server 104 in a cellular network, a second server 106, a third server 108, and one or more networks 110, that may be used to provide positioning assistance data with (e.g., comprising and/or based, at least in part, on) local mapping data 116 to a mobile station 102, in accordance with an implementation.

Mobile station 102 is intended to be representative of any electronic device that may be reasonably moved about by a user. By way of example but not limitation, such a mobile station may comprise a computing and/or communication device such as a mobile telephone, a smartphone, a lap top computer, a tablet computer, a wearable computer, a personal digital assistant, a navigation device, a gaming device, etc., and which, at times, may be operatively associated with one or more cellular networks or the like.

Mobile station 102, first server 104, and/or other devices represented in FIG. 1 may, for example, be enabled (e.g., via one or more network interfaces) for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMax, Ultra Mobile Broadband (UMB), and/or the like.

FIG. 1 illustrates various communication links 120 and one or more networks 110. An apparatus 112 is illustrated within first server 104, which may, for example, support techniques provided herein via one or more communication links 120 and/or network(s) 110. An apparatus 114 is illustrated within mobile station 102, which may, for example, support techniques provided herein via one or more communication links 120 and/or network(s) 110. Local mapping data 116 is illustrated within second server 106, which may, for example, support techniques provided herein via one or more communication links 120 and/or network(s) 110. Second server information 118 is illustrated within third server 108, which may, for example, support techniques provided herein via one or more communication links 120 and/or network(s) 110.

Additionally in FIG. 1, one or more transmitters 130 are illustrated which may, for example, support location operations and/or other techniques provided herein independently and/or via one or more communication links 120 and/or network(s) 110. Transmitter(s) 130 may, for example, transmit one or more wireless signals 132 that may be received by mobile station 102. In FIG. 1, mobile station 102 and transmitter(s) 130 are further illustrated as being within, nearby, and/or otherwise associated in some manner with an indoor environment that may relate to a structure 140, for example.

It should be recognized that one or more communication links 120 shown in FIG. 1, may comprise one or more wireless communication links and/or one or more non-wireless communication links (e.g., with signals transmitted using one or more wires, fibers, etc.), and that such communication links 120 and/or network(s) 110 may also represent various supporting devices and/or technologies associated therewith.

Figure 2:
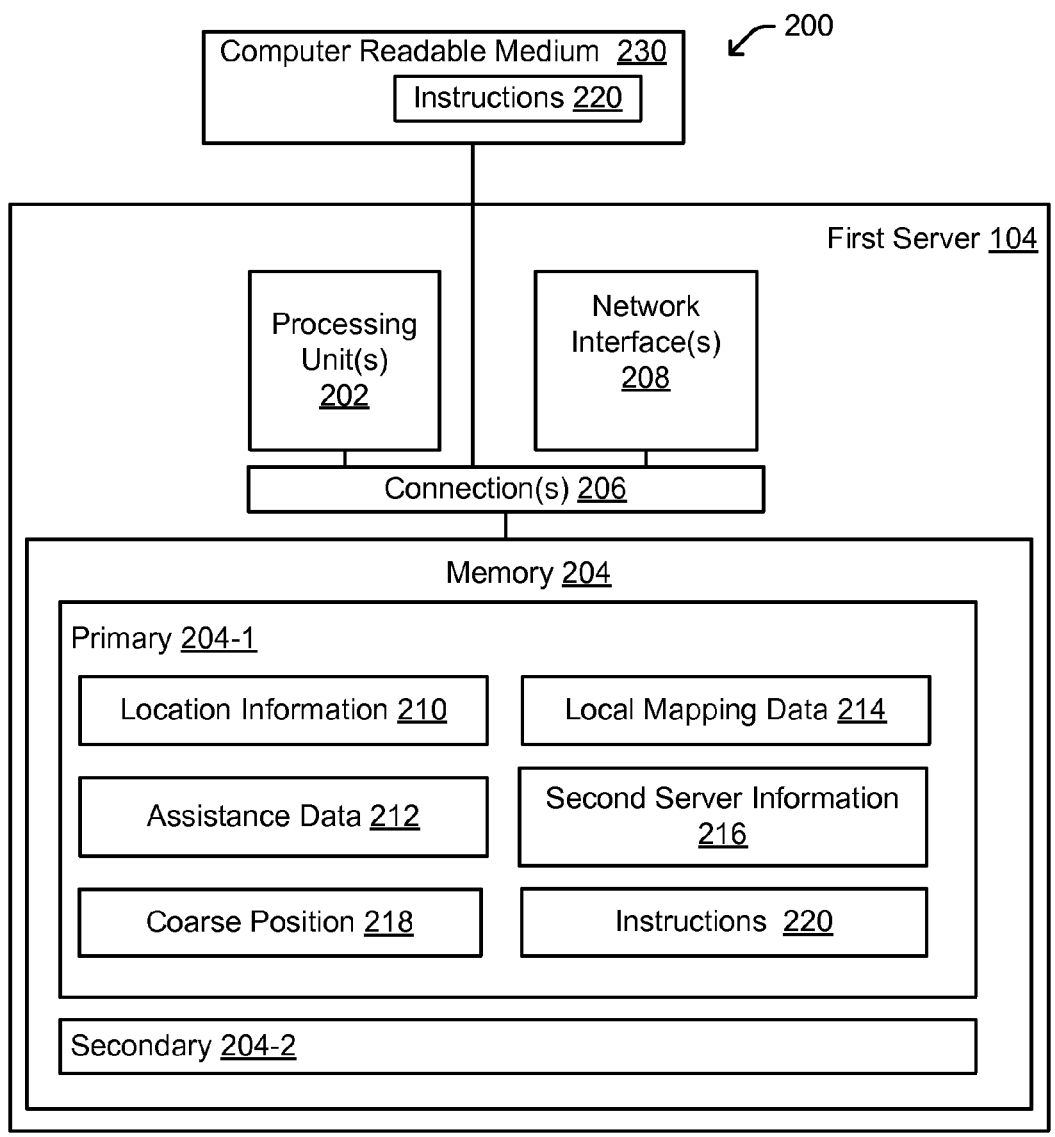
FIG. 2 is a schematic block diagram illustrating certain features of an example computing device capable of providing positioning assistance data with local mapping data to a mobile station, in accordance with an implementation.

Reference is made next to FIG. 2, which is a schematic block diagram illustrating certain features of an example first server 104 capable of providing positioning assistance data 212 with local mapping data 214 to a mobile station, in accordance with an implementation.

FIG. 2 shows a specific computing device 200 in the form of, or hosting, a first server 104, which may act as apparatus 112 (FIG. 1). In certain example implementations, computing device 200 may act as part of a cellular network or the like (represented in FIG. 1 via networks 110), e.g., as a positioning server and/or the like. In certain example implementations, computing device 200 may comprise and/or be coupled to one or more other resources/devices (not shown) that may be arranged to provide additional information useful to apparatus 112.

With this mind, as illustrated in FIG. 2, example computing device 200 may comprise one or more processing units 202, memory 204, connections 206, and one or more network interfaces 208. As shown, memory 204 may comprise a primary memory 204-1, and/or a secondary memory 204-2. Here, for example, primary memory 204-1 may store computer-implementable instructions 220 and/or data relating to apparatus 112, which may be executed or used by processing unit(s) 202.

As illustrated, at certain times primary memory 204-1 may, for example, store information relating to location information 210, assistance data 212, local mapping data 214, second server information 216, and/or coarse position 218. For example, location information 210 and/or coarse position information 218 may be received from mobile station 102 via a network interface 208. For example, local mapping data 214 may be received from second server 106 (FIG. 1) via a network interface 208. For example, second server information 216 may be received from mobile station 102 and/or third server 108 (FIG. 1) via the same or different network interface(s) 208. For example, assistance data 212 may be generated by processing unit(s) 202 and transmitted to mobile station 102 via network interface 208. Network interface(s) 208 may, for example, comprise one or more wireless transmitters/receivers and/or one or more non-wireless interfaces (e.g., Ethernet, etc.).

One or more processing units 202 may, for example, perform data processing (e.g., in accordance with all or part of the techniques provided herein) using memory 204 via one or more connections 206. Processing unit(s) 202 may be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry. Secondary memory 204-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, computer readable medium 230. As illustrated, memory 204 and/or non-transitory computer readable medium 230 may comprise computer-implementable instructions 220 associated with data processing (e.g., in accordance with the techniques provided herein).

Figure 3:
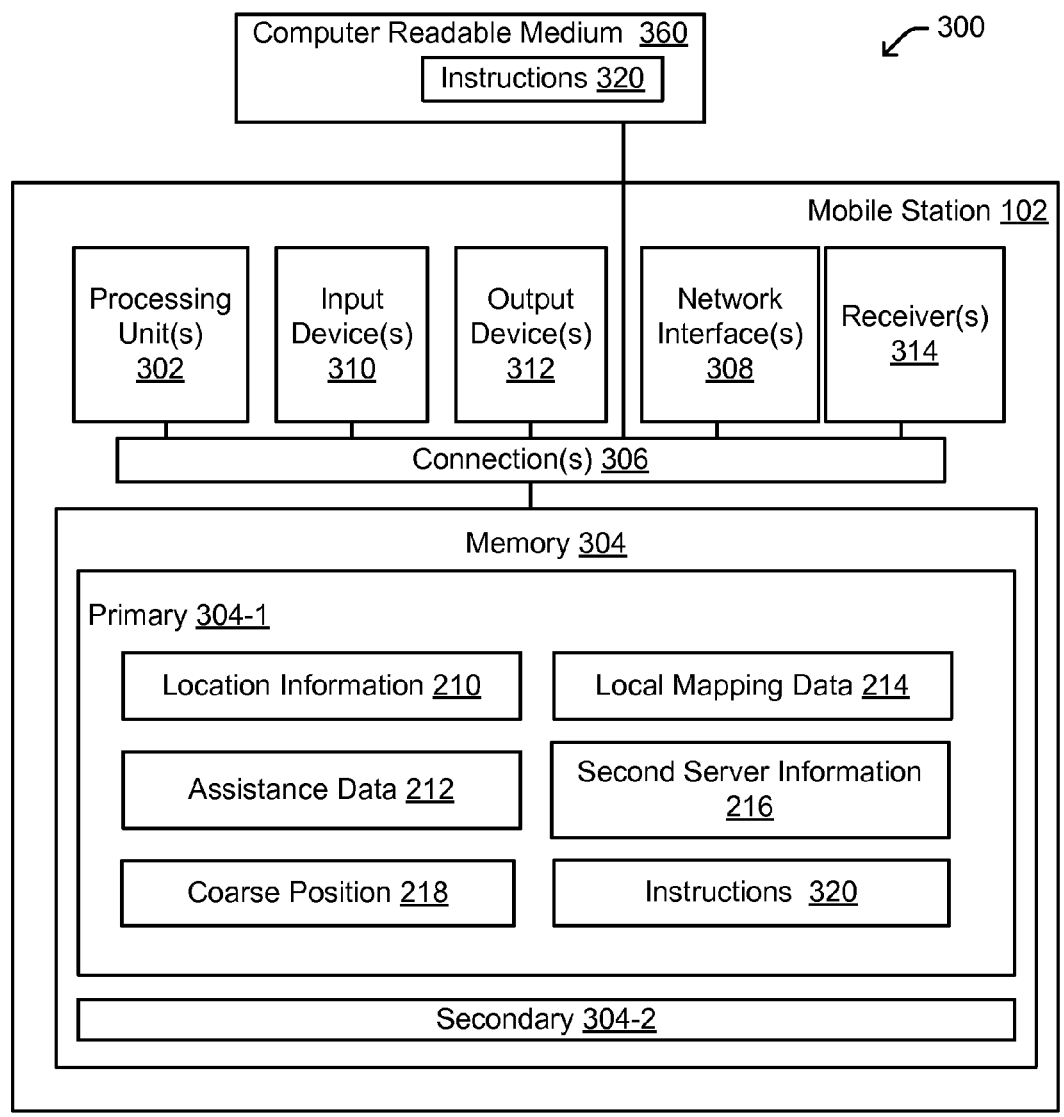
FIG. 3 is a schematic block diagram illustrating certain features of an example mobile station capable of obtaining and using positioning assistance data with local mapping data, in accordance with an implementation.

Reference is made next to FIG. 3, which is a schematic block diagram illustrating certain features of mobile station 102, for example as in FIG. 1, which may be capable of obtaining and using positioning assistance data 212 with local mapping data 214, in accordance with an implementation.

FIG. 3 shows a specific computing device 300 in the form of a mobile station 102 which may act, at least in part, as apparatus 114 (FIG. 1) to obtain and/or otherwise make use of positioning assistance data 212 with local mapping data 214, in accordance with an implementation. In certain instances, mobile station 102 may act, at least in part, as apparatus 114 to access one or more servers, and possibly make use of wireless signals 132 transmitted by one or more transmitters 130 (FIG. 1) and received via one or more receivers 314, for example. In certain example implementations, apparatus 300 may take the form of any electronic device that may be reasonably moved about by a user.

With this mind, as illustrated in FIG. 3, example mobile station 102 may comprise one or more processing units 302, memory 304, connections 306, one or more network interfaces 308, one or more user input devices 310, one or more user output devices 312, and one or more receivers 314. As shown, memory 304 may comprise a primary memory 304-1, and/or a secondary memory 304-2. Here, for example, primary memory 304-1 is illustrated as storing information relating to apparatus 114, which may be executed or used by processing unit(s) 302. For example, apparatus 114 may be executed by processing unit(s) 302 to request or otherwise obtain assistance data 212 with local mapping data 214, establish coarse position 218 and/or location information 210, and/or identify second server information 216. Such information may, for example, be transmitted or received, as applicable, via network interface(s) 308.

As illustrated, mobile station 102 may take the form of a specific computing device comprising one or more processing units 302 to perform data processing (e.g., in accordance with all or part of the techniques provided herein) coupled to memory 304 via one or more connections 306. Processing unit(s) 302 may be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, and the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile station 102. Secondary memory 304-2 may comprise, for example, the same or similar type of memory as primary memory and/or one or more data storage devices or systems, such as, for example, a disk drive, an optical disc drive, a tape drive, a solid state memory drive, etc. In certain implementations, secondary memory may be operatively receptive of, or otherwise configurable to couple to, non-transitory computer readable medium 360. As illustrated, memory 304 and/or computer readable medium 360 may comprise computer-implementable instructions 320 associated with data processing (e.g., in accordance with the techniques provided herein).

In certain example implementations, as illustrated, mobile station 102 may further comprise one or more user input devices 310 (e.g., keyboard, touch screen, etc.) and/or one or more user output devices 312 (e.g., a display, a projector, a speaker, etc.). Hence, for example, location based service, route, map, and/or other like information may be presented to the user via some form of user output. Also, user input may be received which relates to location based services or other capabilities.

Although not illustrated, it should be understood that mobile station 102 may be enabled to perform a variety of tasks, some or many of which may be unrelated to location based services and/or other like position estimation capabilities. Mobile station 102 may comprise one or more receivers 314 to make use of a GPS or other like global navigation satellite system (GNSS) or local navigation capability that may be used in location or position estimation, for example. Additionally, it should be understood that apparatus 114 may be representative of one or more capabilities associated with location based services and/or other like position estimation.

Figure 4:
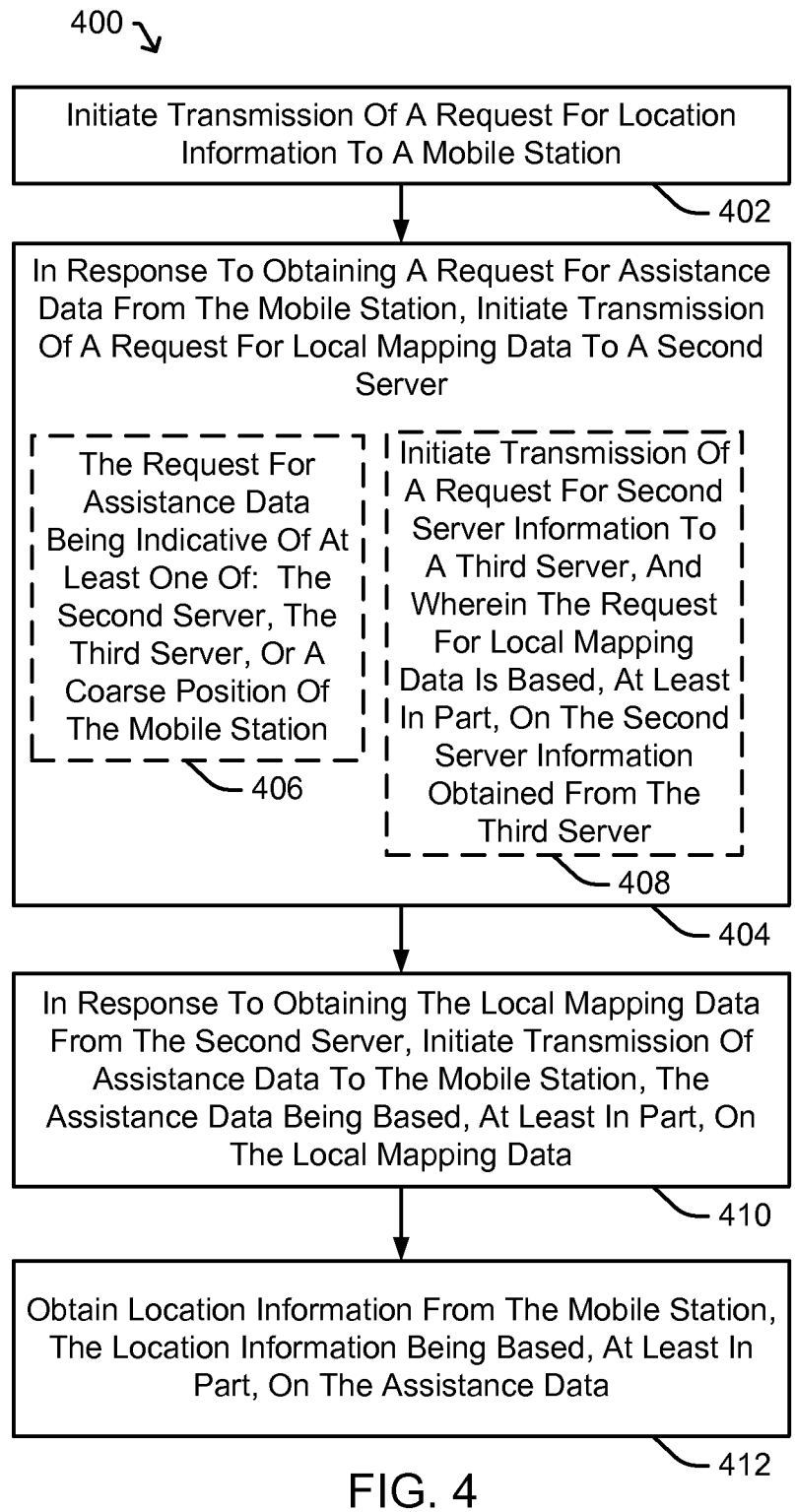
FIG. 4 is a flow diagram illustrating certain features of an example process for use in at least one computing device capable of providing and/or assisting one or more other computing devices in providing positioning assistance data with local mapping data to a mobile station, in accordance with an implementation.

Reference is made next to FIG. 4, which is a flow diagram illustrating certain features of an example process 400 for use in at least one computing device capable of providing and/or assisting one or more other computing devices in providing positioning assistance data with local mapping data to a mobile station, in accordance with an implementation. For example, process 400 may be implemented in apparatus 112 of first server 104 (FIG. 1) in a cellular network.

At block 402, a request for location information may be provided to a mobile station. Here, for example, one or more triggering events and/or service calls may be identified which lead apparatus 112 to initiate such a request. In certain example implementations, a request (or a triggering event) may come from or otherwise relate to an application running on a mobile station or a server or other like computing device, a third party computing device, or the like, which may or may not be part of a cellular network.

At block 404, in response to obtaining a request for assistance data from a mobile station, a request for local mapping data may be provided to a second server. In certain example implementations, at (optional) block 406 a request for assistance data may be indicative of one or more particular second servers, one or more particular third servers, and/or a coarse position of a mobile station. In certain example implementations, at (optional) block 408 a request for second server information may be provided to a third server. Here, for example, a request for local mapping data may be based, at least in part, on second server information obtained from a third server. In certain example implementations, second server information may comprise a network address, and/or other substantially unique identifier associated with a second server.

At block 410, in response to obtaining local mapping data from a second server, assistance data may be provided to a mobile station. Here, for example, assistance data may comprise or otherwise be based, at least in part, on local mapping data.

At block 412, location information may be obtained from a mobile station. Here, for example, location information may be determined based, at least in part, on the assistance data and/or use thereof.

Attention is drawn next to FIG. 5, which is a flow diagram illustrating certain features of an example process 500 that may be implemented in apparatus 114 of mobile station 102 (FIG. 1), for example, to obtaining and/or otherwise may used of positioning assistance data with local mapping data, in accordance with an implementation.

At block 502, a request for assistance data may be provided to a first server 104 (FIG. 1) in a cellular network, for example. Here, for example, such requested assistance data may comprise and/or otherwise be based, at least in part, on local mapping data obtained by the first server from a second server. In certain example implementations, at (optional) block 504, a request for assistance data may be indicative of one or more particular second servers, one or more particular third servers, and/or a coarse position of the mobile station. In certain example implementations, at (optional) block 506, a request for second server information may be provided to a third server and second server information obtained from the third server. Here, for example, such second server information may be indicative of the second server, and a request for assistance data may be based, at least in part, on such second server information.

At block 508, positioning assistance data may be obtained from a first server. At block 510, location information associated with the mobile station may be determined based, at least in part, on the obtained positioning assistance data. At block 512, location information may be provided to the first server and/or other like devices, services, applications, etc.

In accordance with certain aspects, the techniques provided herein may allow for a fine-grained local position determination (so-called "indoor positioning") in which a positioning server in the operator's network may be involved in the collection and delivery of assistance data and/or position estimates.

Various (typically) proprietary approaches to indoor positioning are well known. In these approaches, and in similar schemes potentially using an open API but outside the standardization scope of any involved cellular network, a mobile device communicates first with a "directory server", which provides, based on the approximate (e.g., the scale of a large facility such as an airport) position of the mobile device, an IP address or other routing information for a "mapping server". The mobile device then communicates with the mapping server to obtain supporting information for indoor positioning measurements, such as the locations of nearby WLAN access points relative to which the device may determine its position.

In order to obtain a coarse position, it may be useful for a mobile station to interact with a cellular network containing a positioning server, using a positioning protocol, e.g., Long Term Evolution (LTE) Positioning Protocol (LPP), LPP enhanced (LPPe), Radio Resource Location Services (LCS) Protocol (RRLP), possibly other protocols, such as, Secure User Plane Location (SUPL), etc.

In a simple approach, a mobile station may first obtain its own coarse position from a cellular network's positioning facilities, e.g., via an MO-LR (Mobile Originated Location Request) operation. After such a procedure, a mobile station may be aware of its approximate position and may provide it to a directory server. The delivery of assistance data and request/response messages to obtain a positioning estimate may, for example, take place under the auspices of a positioning protocol such as RRLP, LPP, LPPe, etc.

Alternatively, an originator of a (indoor) positioning request may be a separate entity, e.g., a remote server or peer interested in the position of a mobile station. In such a case, a requesting entity may first trigger an MT-LR (Mobile Terminated Location Request) towards a mobile station to obtain the coarse position, and then provide that position to the mobile station along with instructions to start an indoor positioning procedure. However, such an approach may require that a server be able to establish IP connectivity to the mobile station, and perhaps more importantly, might remove some positioning functionality from a domain of an operator's positioning server. The latter may be problematic if an operator desires to ensure that positioning is a billable event, and quite serious if lawful intercept may be required. There is thus a need for techniques, such as those presented herein, that may be employed to integrate indoor positioning with other positioning methods, e.g., in a cellular network controlled by a positioning server.

In one example approach presented herein, local mapping data (e.g., possibly part of an electronic map) are provided, not to a mobile station ultimately intended to be positioned, but to a cellular operator's positioning server (first server) for forwarding to the mobile station. Thus it is not the mobile station, but a positioning server, that is responsible for contacting a mapping server (second server). Here, for example such a contact may be triggered by a request for assistance data, which might be realized within a positioning protocol, potentially as an extension to the basic protocol that encapsulates certain messages for an indoor positioning method.

Figure 6:
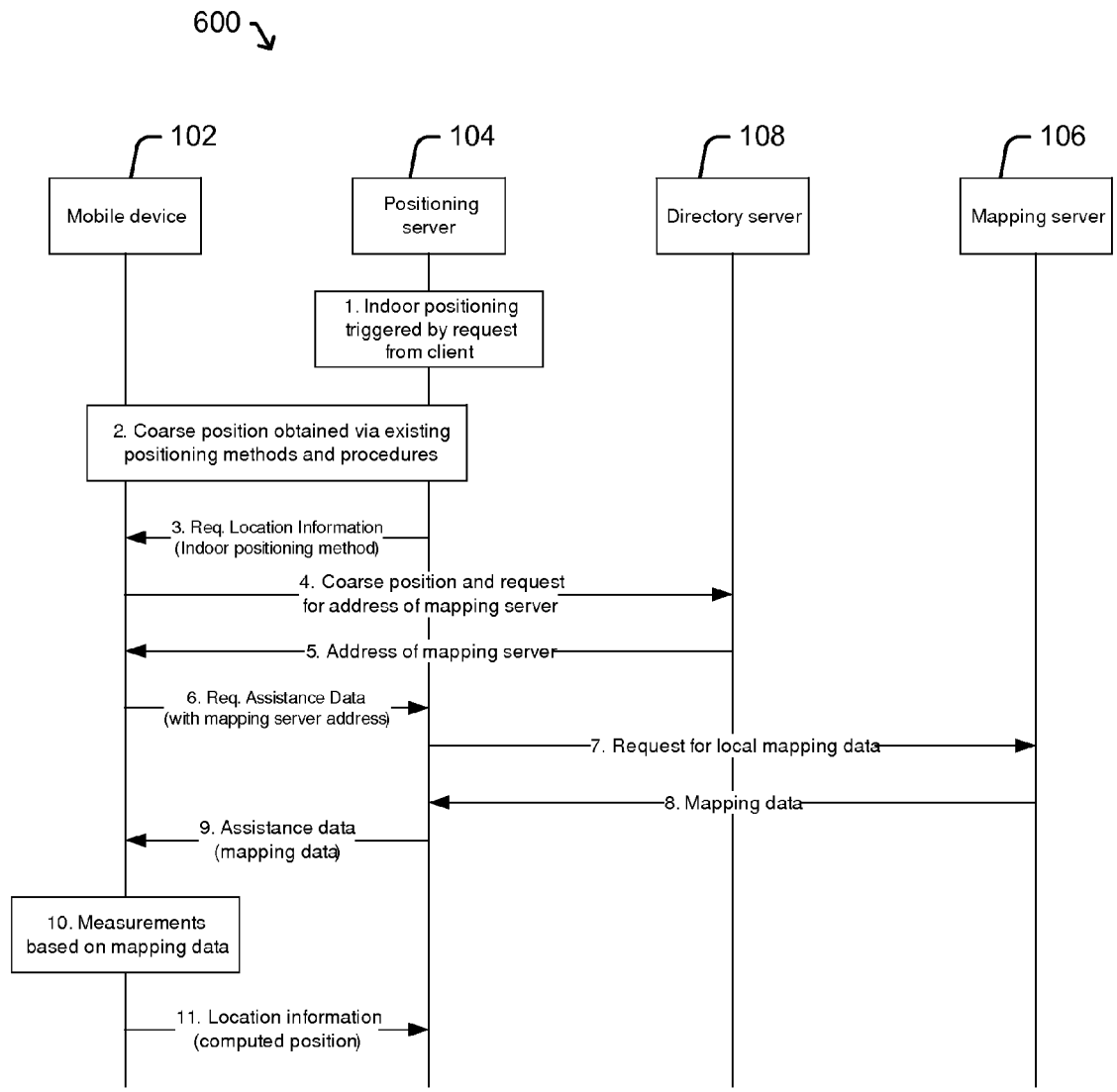
FIG. 6 is a call flow diagram illustrating certain features of an example process during which positioning assistance data with local mapping data is provided to a mobile station, in accordance with an implementation.

With this in mind, attention is drawn next to FIG. 6, which is a call flow diagram illustrating certain features of an example process 600 during which positioning assistance data with local mapping data may be provided to a mobile station, in accordance with an implementation.

In example act 1 indoor positioning may be triggered, e.g., as previously described. In example act 2, a coarse position may be obtained, e.g., as also previously described. Example acts 3, 6, 9, and 11 may take place as part of a positioning protocol (e.g., RRLP, LPP, LPPe, etc.) operating between a mobile station 102 and a positioning server (first server 104). The discovery of an address for a mapping server (second server 106), e.g., via example acts 4 and 5 by mobile station 102, allows the applicable address to be provided to the positioning server via example act 6. As such, the positioning server may use the received address to retrieve local mapping data, e.g., via example acts 7 and 8. Local map data may, for example, be provided as assistance data in example act 9. In example act 10, the mobile station may take signal measurements based on the assistance data, and provide a computed (estimated) position or location in location information per act 11 to the positioning server.

Since certain local mapping data may be considered sensitive, it may be useful to encrypt and/or otherwise obscure such data in such a manner as to be readable by a particular mobile station but not by an intervening server or other device. Many appropriate techniques for such end-to-end or other like encryption exist in the art, which may be employed for such purposes.

Figure 7:
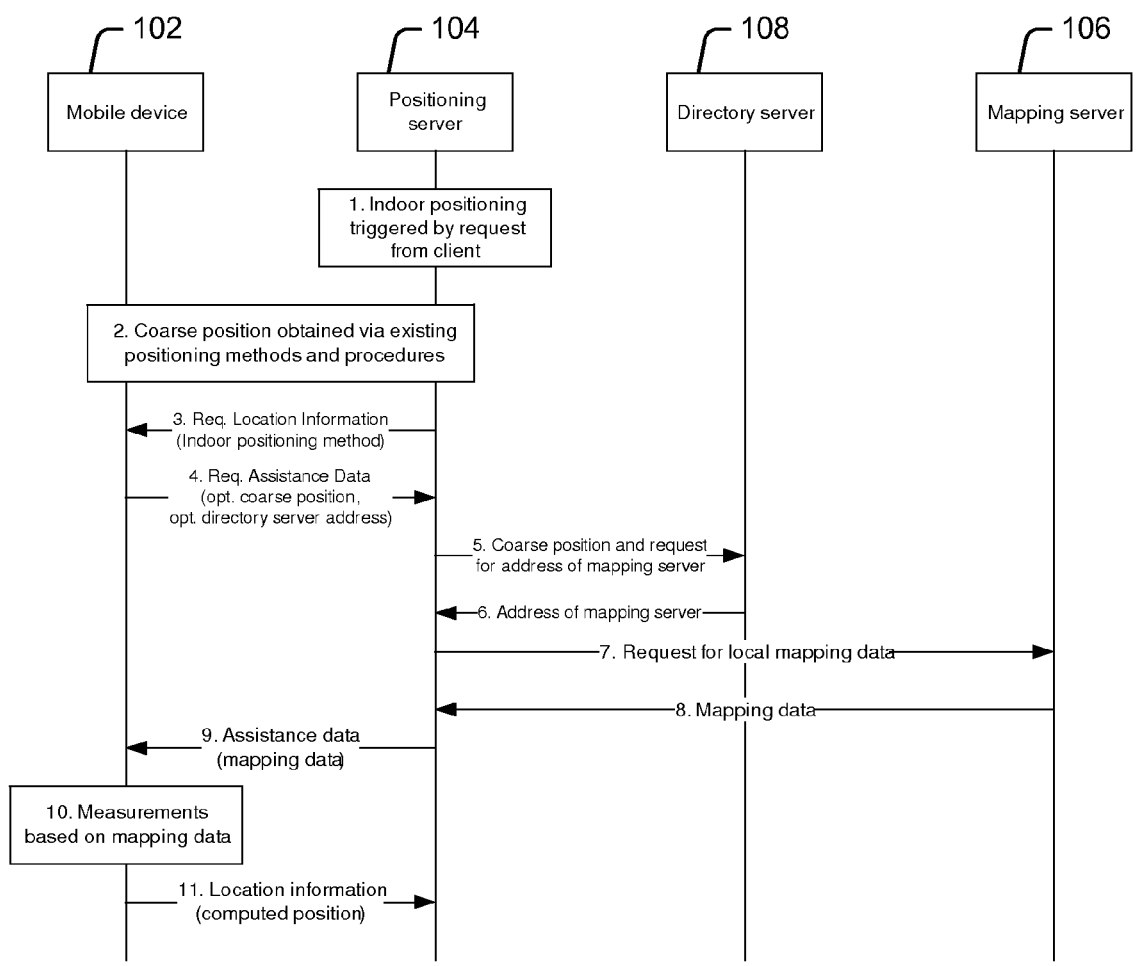
FIG. 7 is a call flow diagram illustrating certain features of another example process during which positioning assistance data with local mapping data is provided to a mobile station, in accordance with an implementation.

Attention is drawn next to FIG. 7, which is a call flow diagram illustrating certain features of another example process 700 during which positioning assistance data with local mapping data may provided to a mobile station, in accordance with an implementation.

Here, as an alternative, a positioning server (first server 104) may itself obtain an address of a mapping server (second server 106), using a directory server (third server 108) whose address may, for example, be provided by a device or by a client requesting a mobile station's position, and/or known in advance to the server.

Here, for example, a directory server address may be made available to a positioning server in example act 4; however, as noted above, in certain instances such address may also be delivered with an initial request from a client entity in example act 1, and/or known a priori to a positioning server. Example positioning protocol aspects (e.g., in acts 3, 4, 9, and 11) are similar to those in process 600 of FIG. 6, except that contact information for a mapping server may not be provided to a positioning server, but may instead be discovered by the positioning server via example acts 5 and 6 in process 700.

It should be noted as well that an availability of a coarse position of a mobile station may not be necessary; for example, if a positioning operation in example act 2 results in a position being known to a positioning server instead (e.g., an Network Induced Location Request (NI-LR) operation), a positioning server may already have a coarse position for use in example act 5. Thus, a coarse position in example act 4 may be optional.

Thus, by way of further illustration, with the example techniques provided herein, one may implement a method for determining an estimated position of a mobile station in a wireless network. Here, for example, a method may comprise: obtaining an approximate coarse position for a mobile station via a first positioning operation; obtaining from a first server an address of a second server based at least in part on the coarse position; obtaining from the second server by an element of wireless network assistance data for a second positioning operation; delivering the assistance data to the mobile station; performing, by the mobile station, measurements in support of a second positioning operation; and, wherein the second positioning operation results in the estimated position of the mobile station.

In certain example implementations, obtaining the address of the second server may be performed by the mobile station. In certain example implementations, the address of the second server may be forwarded by the mobile station to the positioning server. Here, for example, such forwarding may take place using a positioning protocol, such as, for example, LPP, LPPe, RRLP, etc. In certain instances, for example, such forwarding may take place using a message of LPP extended to contain an address or other like identifier of the second server, e.g., as part of a request for assistance data. Thus, for example, local mapping data received from the second server may be sent to the mobile station as assistance data responsive to the request for assistance data. Here, for example, such data may be sent to the mobile station using a message of LPP extended to contain data received or data based, at least in part, thereon from the second server.

In certain example implementations, obtaining an address of the second server may be performed by a cellular network element. Here, for example, such a network element may comprise a positioning server. As such, for example, obtaining the address of the second server may be triggered by a reception at the positioning server of a request for assistance data. Here, for example, a request for assistance data may comprise a message of a positioning protocol such as, for example, LPP, LPPe, RRLP, etc. In certain instances, for example, an LPP message may comprise a request for assistance data which may be extended to include one or more fields that may be used in obtaining the address of the second server. In certain example implementations, an LPP message may comprise a coarse position of the mobile station, and/or an address or other like second server information.

In certain example implementations, delivery to the mobile station of the local mapping data received from a second server may occur as a delivery of assistance data responsive to a request. Here, for example, delivery of assistance data may make use of a message of a positioning protocol, such as, for example, LPP, LPPe, RRLP, etc. In certain example implementations, delivery of assistance data may include the use of a message of LPP extended to provide the local mapping data received from the second server and/or data based thereon to a mobile station.

In certain example implementations, a coarse position of a mobile station may be obtained by a network element as a result of a first positioning operation. In certain example implementations, addresses of one or more servers may be provided as a configuration parameter to a network element.

Reference throughout this specification to "one example", "an example", "certain examples", or "example implementation" means that a particular feature, structure, or characteristic described in connection with the feature and/or example may be included in at least one feature and/or example of claimed subject matter. Thus, the appearance of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "selecting", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. In still other memory devices, a change in physical state may involve quantum mechanical phenomena, such as, superposition, entanglement, or the like, which may involve quantum bits (qubits), for example. The foregoing is not intended to be an exhaustive list of all examples in which a change in state for a binary one to a binary zero or vice-versa in a memory device may comprise a transformation, such as a physical transformation. Rather, the foregoing are intended as illustrative examples.

A computer-readable (storage) medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, in a first server in a cellular network:
    sending, from the first server, a request for location information to a mobile station;
    receiving, at the first server from the mobile station, a request for assistance data, the request for the assistance data indicating an address of a second server;
    sending, from the first server and based on the address of the second server indicated in the request for the assistance data received from the mobile station, a request for local mapping data to the second server;
    receiving, at the first server from the second server, the local mapping data;
    sending the assistance data to the mobile station from the first server, the assistance data being based, at least in part, on the local mapping data wherein the assistance data identifies at least one wireless signal transmitter; and
    receiving, at the first server, the location information from the mobile station, the location information being based, at least in part, on the assistance data and on a positioning operation based, at least in part, on at least one wireless signal transmitted by the at least one wireless signal transmitter identified in the assistance data.

2. The method of claim 1, wherein the at least one wireless signal transmitter comprises a local area network access point.

3. The method of claim 1, wherein the address of the second server is based on a coarse position of the mobile station.

4. The method of claim 1, wherein the address of the second server is obtained from a third server.

5. The method of claim 1, wherein the location information includes a computed mobile device position.

6. An apparatus for use in a cellular network, the apparatus comprising a first server comprising:
    means for sending a request for location information to a mobile station;
    means for receiving, from the mobile station, a request for assistance data, the request for the assistance data indicating an address of a second server;
    means for sending, based on the address of the second server indicated in the request for the assistance data received from the mobile station, a request for local mapping data to the second server;
    means for receiving, from the second server, the local mapping data;

means for sending the assistance data to the mobile station, the assistance data being based, at least in part, on the local mapping data wherein the assistance data identifies at least one wireless signal transmitter; and means for receiving, at the first server, the location information from the mobile station, the location information being based, at least in part, on the assistance data and on a positioning operation based, at least in part, on at least one wireless signal transmitted by the at least one wireless signal transmitter identified in the assistance data.

7. The apparatus of claim 6, wherein the at least one wireless signal transmitter comprises a local area network access point.

8. The apparatus of claim 6, wherein the address of the second server is based on a coarse position of the mobile station.

9. The apparatus of claim 6, wherein the address of the second server is obtained from a third server.

10. The apparatus of claim 6, wherein the location information includes a computed mobile device position.

11. A server for use in a cellular network, the server being a first server comprising:
at least one network interface; and
at least one processing unit wherein, via the at least one network interface, the at least one processing unit being configured to:
send a request for location information to a mobile station;
receive, from the mobile station, a request for assistance data, the request for the assistance data indicating an address of a second server;
send, based on the address of the second server indicated in the request for the assistance data received from the mobile station, a request for local mapping data to the second server;
receive, from the second server, the local mapping data;
send the assistance data to the mobile station, the assistance data being based, at least in part, on the local mapping data wherein the assistance data identifies at least one wireless signal transmitter; and
receive, at the first server, the location information from the mobile station, the location information being based, at least in part, on the assistance data and on a positioning operation based, at least in part, on at least one wireless signal transmitted by the at least one wireless signal transmitter identified in the assistance data.

12. The server of claim 11, wherein the at least one wireless signal transmitter comprises a local area network access point.

13. The server of claim 11, wherein the address of the second server is based on a coarse position of the mobile station.

14. The server of claim 11, wherein the address of the second server is obtained from a third server.

15. The server of claim 11, wherein the location information includes a computed mobile device position.

16. An article comprising:
a non-transitory computer readable medium, of a first server, having stored therein computer-implementable instructions configured to cause one or more processing units of the first server to:
send a request for location information to a mobile station;
receive, from the mobile station, a request for assistance data, the request for the assistance data indicating an address of a second server;
send, based on the address of the second server indicated in the request for the assistance data received from the mobile station, a request for local mapping data to the second server;
receive, from the second server, the local mapping data;
send the assistance data to the mobile station, the assistance data being based, at least in part, on the local mapping data wherein the assistance data identifies at least one wireless signal transmitter; and
receive, at the first server, the location information from the mobile station, the location information being based, at least in part, on the assistance data and on a positioning operation based, at least in part, on at least one wireless signal transmitted by the at least one wireless signal transmitter identified in the assistance data.

17. The article of claim 16, wherein the at least one wireless signal transmitter comprises a local area network access point.

18. The article of claim 16, wherein the address of the second server is based on a coarse position of the mobile station.

19. The article of claim 16, wherein the address of the second server is obtained from a third server.

20. The article of claim 16, wherein the location information includes a computed mobile device position.

21. The method of claim 1, wherein the local mapping data identifies the at least one wireless signal transmitter.

* * * * *